United States Patent [19]
Weisman, II

[11] Patent Number: 4,611,285
[45] Date of Patent: Sep. 9, 1986

[54] METHOD OF CONTROLLING AUTOMATIC TRANSMISSION SHIFT PRESSURE

[75] Inventor: S. Miller Weisman, II, Southfield, Mich.

[73] Assignee: Ford Motor Company, Dearborn, Mich.

[21] Appl. No.: 596,970

[22] Filed: Apr. 5, 1984

[51] Int. Cl.$^4$ .............................................. B60K 41/08
[52] U.S. Cl. .................................. 364/424.1; 74/867; 74/866; 74/752 A
[58] Field of Search ................ 364/424.1; 74/865, 866, 74/867, 868, 752 A

[56] References Cited

U.S. PATENT DOCUMENTS

| | | |
|---|---|---|
| 3,727,487 | 4/1973 | Forster et al. |
| 4,041,810 | 8/1977 | Harmon et al. .................... 74/868 |
| 4,044,634 | 8/1977 | Florus et al. |
| 4,082,013 | 4/1978 | Dornfeld et al. |
| 4,107,776 | 8/1978 | Beale . |
| 4,252,148 | 2/1981 | Fochtman et al. |
| 4,261,229 | 4/1981 | Mizuno et al. |
| 4,308,764 | 1/1982 | Kawamoto et al. |
| 4,314,340 | 2/1982 | Miki et al. |
| 4,335,428 | 6/1982 | Miki et al. |
| 4,338,666 | 7/1982 | Suzuki et al. |
| 4,351,206 | 9/1982 | Lemieux et al. |
| 4,354,236 | 10/1982 | Miki et al. |
| 4,367,528 | 1/1983 | Kawamoto et al. |
| 4,380,048 | 4/1983 | Kishi et al. |
| 4,388,845 | 6/1983 | Kishi et al. |
| 4,389,910 | 6/1983 | Lockhart ........................ 364/424.1 |
| 4,393,467 | 7/1983 | Miki et al. |
| 4,438,665 | 3/1984 | Schmidt ............................ 74/867 |
| 4,462,279 | 7/1984 | Sumiya ............................. 74/868 |
| 4,487,303 | 12/1984 | Boueri et al. ..................... 74/866 |
| 4,493,228 | 1/1985 | Vukovich et al. ................ 74/866 |
| 4,507,986 | 4/1985 | Okamura et al. ................ 74/866 |

Primary Examiner—Parshotam S. Lall
Attorney, Agent, or Firm—Peter Abolins; Robert D. Sanborn

[57] ABSTRACT

A method of selecting a desired transmission gear by controlling the duty cycle of a solenoid applying hydraulic pressure to one side of a transmission shift valve in relation to the hydraulic pressure applied to the other side.

11 Claims, 3 Drawing Figures

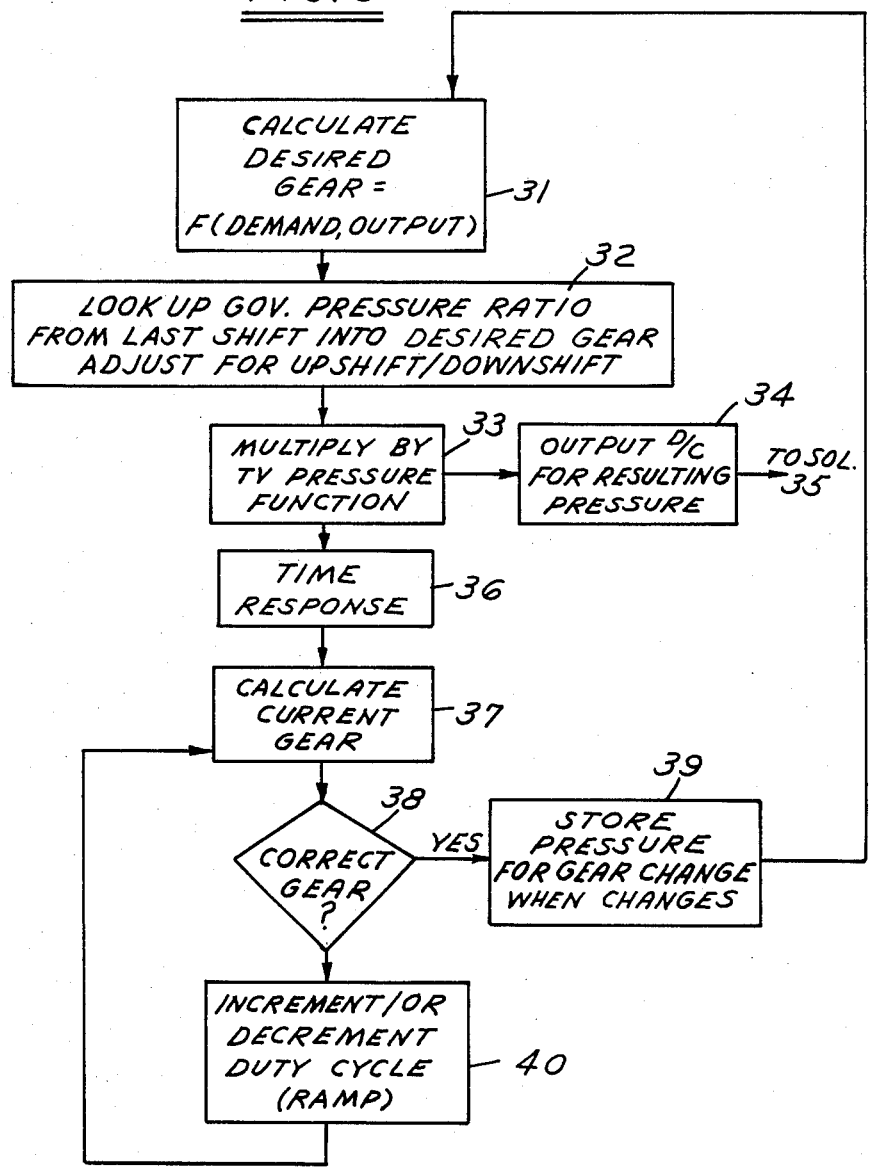

METHOD OF CONTROLLING AUTOMATIC TRANSMISSION SHIFT PRESSURE

BACKGROUND OF THE INVENTION

1. Field of the Invention

This invention relates to controlling automatic transmissions.

2. Prior Art

Various hydraulic transmission systems are known. For example, it is known to have various hydraulic logic systems controlling hydraulic valves governing transmission shift pressure and a transmission input torque capacity pressure. In turn, hydraulic force from two hydraulic lines carrying these two pressures is applied to a shift valve to cause shifting between gears. Also known are electronically controlled transmissions wherein electrical logic signals are used to activate a solenoid which then permits hydraulic shifting of the gears. However, such systems are not readily compatible with one another and each requires unique specialized apparatus not required by the other. It would be desirable to achieve an improved electronic transmission control without the necessity for a complete modification of the hydraulic transmission apparatus. These are some of the problems this invention overcomes.

Some known transmission systems have shifts between transmission gear ratios caused by a shift valve responsive to a ratio between a TV (throttle valve) pressure indicating driver demand caused by gas pedal depression and a governor pressure indicative of vehicle speed. Various ratios of TV pressure/governor pressure cause successive gearshifts between first and second gear, second and third gear, and third and fourth gear. To maintain, for example, second gear, the desired ratio of TV pressure/governor pressure would be someplace between the pressure ratio value causing the shift from second to first gear and the value causing the shift from second to third gear. To get the governor pressure corresponding to a particular pressure ratio, the pressure ratio is multiplied by a function of the TV pressure. If the actual gear is different from the desired gear, the transmission is checked for switching between transmission gear ratios. If no gear change occurs, the governor pressure is ramped until a gear change occurs.

The use of a solenoid valve for controlling the pressure of a hydraulic medium is further described in U.S. Pat. No. 3,727,487 issued Apr. 17, 1973, to Forster et al, entitled "Pressure Control Installation for Hydraulically Shifted Automatic Transmissions, Especially for Motor Vehicles," the disclosure of which is incorporated herein by reference. The following patents are generally related to the use of a solenoid in an electronic control system to provide signals to hydraulic shift valves causing transmission gearshifts: U.S. Pat. Nos. 4,044,634; 4,082,013; 4,107,776; 4,252,148; 4,261,229; 4,308,764; 4,314,340; 4,335,428; 4,338,666; 4,351,206; 4,354,236; 4,367,528; 4,380,048; 4,388,845; 4,393,467. However, these patents typically teach the use of a plurality of solenoids in combination with a plurality of hydraulic shift valves to shift the transmission gears so that there is one or more shift valve per gear ratio. It would be desirable to achieve a simpler transmission control. For example, in addition to the one solenoid typically used in all hydraulically controlled automatic transmissions for line pressure control i.e., control of the transmission input torque capacity pressure, it would be desirable to use only one additional solenoid for all shift related control regardless of the number of available gear ratios. Further, none of these patents teach calculating a throttle valve/governor pressure ratio for use in controlling the transmission.

SUMMARY OF THE INVENTION

A method of selecting a desired transmission gear ratio in a stepped ratio, electronically controlled hydraulic transmission includes sensing a function of driver demand and calculating desired transmission gear ratios as a function of driver demand and vehicle speed. The method then includes selecting a first function of a predetermined ratio of transmission shift pressure to transmission input torque capacity pressure. The transmission shift pressure is changed to achieve the selected predetermined ratio. That is, governor pressure (determining transmission shift pressure and a function of vehicle speed) is changed to achieve a predetermined ratio with respect to throttle valve pressure (determining transmission input torque capacity and a function of driver demand).

Advantageously, the method of the invention can also include an adaptive feature wherein the actual gear ratio is sensed and compared to the desired gear ratio and a difference is detected. A second function including the first function of the ratio of the transmission shift pressure to transmission input torque capacity pressure and an additional function of time is used to change the transmission shift pressure. This can be implemented, for example, by changing the duty cycle of a solenoid regulating a governor pressure line. When the actual and desired gear ratios are the same, the ratio of shift pressure to transmission input torque capacity pressure is stored for future use.

In accordance with one embodiment of this invention, an electronic control system for an automatic hydraulic transmission includes an electrical logic signal. The electrical logic signal controls a solenoid which in turn controls hydraulic pressure applied to a hydraulic shift valve (corresponding to a governor) to cause shift between transmission gears. Gearshifts are caused by a gear shift valve which has on one side a throttle valve pressure indicating driver demand caused by gas pedal depression and on another side a governor pressure indicating vehicle speed. Various ratios of the throttle valve pressure/governor pressure cause successive gearshifts between first and second gear through third and fourth gears. An adaptive feature includes storing the throttle valve pressure/governor pressure ratio in the electronic control system for use in a control algorithm for subsequent gearshifts. In accordance with an embodiment of this invention, a single solenoid controlled valve, in turn, controls three hydraulic shift valves to cause the gearshifts. The solenoid is provided with control signals from the controller logic program.

BRIEF DESCRIPTION OF THE DRAWINGS

FIG. 3 is a more detailed block diagram of portions of the block diagram of FIG. 1 including the logic flow diagram for the controller in accordance with an embodiment of this invention.

DETAILED DESCRIPTION OF THE INVENTION

Figure 1:
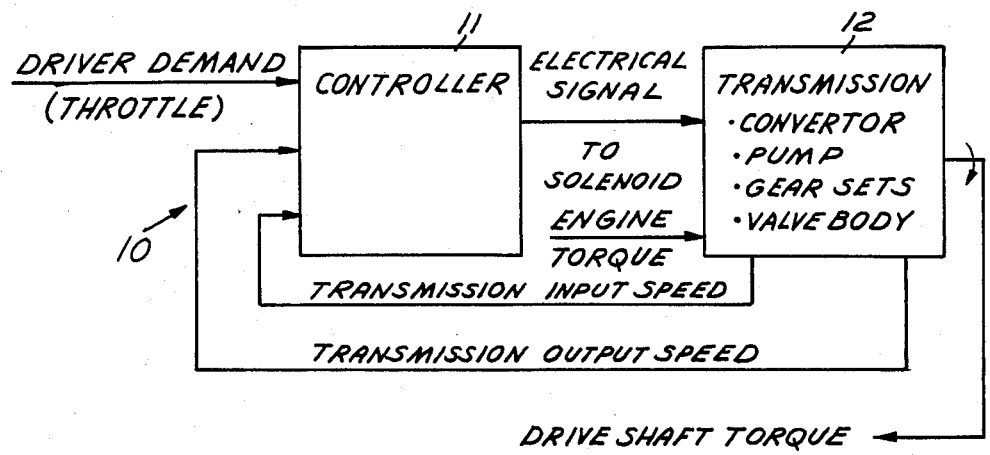
FIG. 1 is a block diagram of an electrically-controlled step-ratio, hydraulic transmission in accordance with an embodiment of this invention.

Referring to FIG. 1, a stepped-ratio electronically-controlled hydraulic transmission system 10 includes a controller 11 and a transmission 12. Controller 11 has as inputs driver demand (throttle), transmission input speed, and transmission output speed. Controller 11 generates an electrical signal to control a shift solenoid and applies a signal to transmission 12. Transmission 12 also senses engine torque and generates transmission input speed, transmission output speed and a drive shaft torque.

Figure 2:
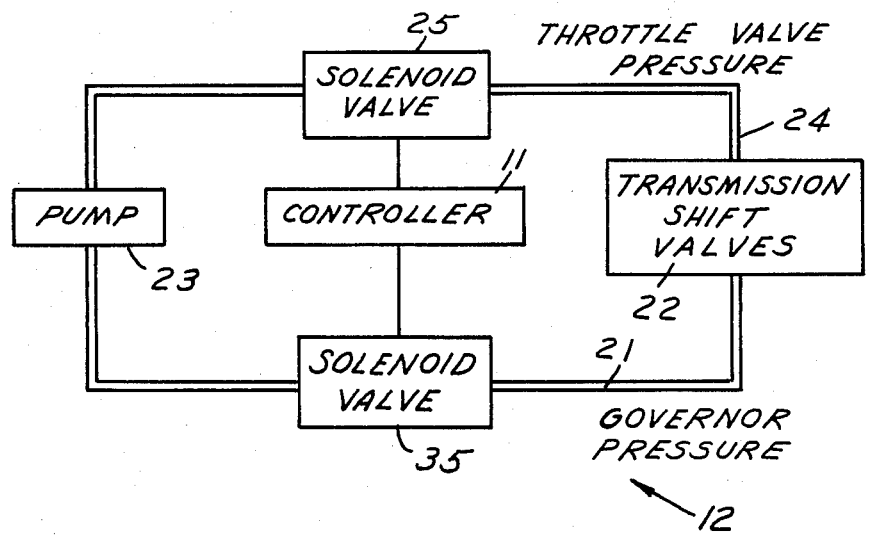
FIG. 2 is another version of the block diagram of FIG. 1.

Referring to FIG. 2, a pump 23 supplies hydraulic pressure to a governor pressure line 21 and a throttle valve pressure line 24. A solenoid valve 25 modulates hydraulic pressure in throttle valve line 24 and a solenoid valve 35 modulates hydraulic pressure in governor pressure line 21. Lines 24 and 21 are coupled to opposing sides of transmission shift valve 22 to cause gear shifting. Advantageously, transmission shift valves 22 include, in parallel, a shift valve for each gear ratio shift. A controller 11 is coupled to solenoid valves 25 and 35 to control activation of the solenoid valves.

Referring to FIG. 3, the logic flow in controller 11 begins with a block 31 which includes the step of calculating the desired transmission gear ratio as a function of throttle, vehicle speed, and desired transmission performance characteristics. For example, transmission performance characteristics can be controlled by a driver operated switch selection input to permit the transmission to operate in, for example, an economy or performance mode. Logic flow then goes to a block 32 wherein the desired governor pressure ratio corresponding to the last shift into the desired gear is determined from a stored look-up table. Advantageously, whether the shift is an upshift or a downshift is also taken into account. For example, the governor pressure ratio for an upshift can be stored and the corresponding downshift ratio computed using an offset to create a hysteresis loop and avoid instability. Logic flow then goes to a block 33 wherein the pressure ratio is determined as a function of the throttle valve pressure. Logic flow from block 33 goes to a block 34 wherein the output duty cycle to determine and achieve the pressure ratio is computed and applied to a solenoid 35 which controls flow in a hydraulic line 21 in order to effect functioning of a shift valve 22 (see FIG. 2).

Logic flow from block 33 also goes to a block 36 which provides a time response function to delay sensing the transmission gear condition until the transmission has time to respond. From block 36 logic flow goes to a block 37 wherein the current gear is calculated. Logic flow from block 37 goes to a block 38 where it is questioned whether the correct gear is engaged in the vehicle. If the answer is yes, logic goes to a block 39 wherein the pressure ratio is stored for future use. From block 39 logic flow returns to initial block 31. If the answer is no, logic flow goes to a block 40 wherein the duty cycle is varied so as to cause the desired gear change. A typical variation of duty cycle with respect to time is a piecewise linear function with increasing slope having a maximum limit. Other functions of time may also be advantageous to change duty cycle. From logic block 40 logic flow returns to logic block 37.

The determination of the actual transmission gear ratio is done by computing the ratio of the input speed of the gear set with respect to the output speed of the gear set. If the actual gear ratio is not the same as the desired gear ratio and if there has been no change, the transmission shift pressure is ramped until a gear ratio change occurs. That is, controller 11 adjusts the duty cycle applied to solenoid valve 35 so as to control the governor pressure of line 21 applied to transmission shift valve 22. The system incorporates an adaptive feature by storing the pressure ratio when the gear ratio changes. The information required by the system to determine what transmission gear is in extent a function of engine torque and RPM (i.e. inputs to the torque converter) and can be derived from dividing the product of the input speed to the torque converter of the transmission and the input to output ratio of the torque converter (thereby giving output speed of the torque converter) by the output speed of the transmission gear set. The input to output ratio of the transmission torque converter can be computed from a torque converter equation describing the physical properties of the torque converter and the inputs to the torque converter. A second way of deriving gear change information is to look at the output of the torque converter using a turbine speed sensor and dividing it by the output speed of the transmission gear set. Finally, a third way of determining gear ratio information is to use pressure switches monitoring the activating hydraulic lines to check for gear ratio changes by sensing hydraulic pressure.

The logic flow of FIG. 3 advantageously includes provision for a hysteresis effect. That is, as the duty cycle, and therefore the hydraulic shifting pressure, is varied in a first direction to provide an upshift, the shift point is stored for future use. However, between the same two gear ratios the stored up shift point is not used when downshifting. Such a difference in the shift points between the same two gear ratios, depending on whether there is an upshift or a downshift, is an advantageous hysteresis to prevent hunting between gear ratios causing an undesirable instability. Typically, the stored hydraulic pressure ratio (of governor pressure to throttle valve pressure) is suitable for upshifts and then decreased by a predetermined constant to establish a downshift point.

Various modifications and variations will no doubt occur to those skilled in the various arts to which this invention pertains. For example, the particular way of sensing gear changes may be varied from that disclosed herein. These and all other variations which basically rely on the teachings through which this disclosure has advanced the art are properly considered within the scope of this invention.

I claim:

1. A method of selecting a desired transmission gear ratio in a stepped ratio, electronically-controlled, hydraulic transmission, including the steps of:
    (a) sensing a function of driver demand requesting power transfer by the hydraulic transmission;
    (b) calculating a desired transmission gear ratio as a function of actual driver demand and actual vehicle speed;
    (c) selecting, as a function of the desired transmission gear ratio, a first function of a stored predetermined ratio of desired transmission shift pressure to transmission input torque capacity pressure; and
    (d) changing the actual transmission shift pressure so the ratio of the actual transmission shift pressure to the transmission input torque capacity pressure approaches the selected predetermined ratio.

2. A method as recited in claim 1 further comprising the steps of:
sensing the actual transmission gear ratio;
comparing the actual sensed transmission gear ratio to the desired gear ratio; and
stopping the changing of the actual transmission shift pressure when the actual sensed transmission gear ratio is the same as the desired transmission gear ratio.

3. A method as recited in claim 1 further comprising the steps of:
sensing the actual transmission gear ratio;
comparing the actual sensed transmission gear ratio to the desired transmission gear ratio;
detecting a difference between the actual sensed transmission gear ratio and the desired transmission gear ratio;
selecting a second function of the combination of the first function and time;
changing the actual transmission shift pressure in accordance with the second function;
sensing the actual transmission gear ratio;
comparing the actual sensed transmission gear ratio to the desired transmission gear ratio;
performing the changing, sensing, comparing steps until the actual sensed transmission gear ratio is the same as the desired transmission gear ratio; and
storing a function of the actual transmissions shift pressure and transmission input torque capacity pressure corresponding to the point when the actual and the desired transmission gear ratios are the same.

4. A method as recited in claim 3 wherein the step of changing the actual transmission shift pressure includes the steps of:
calculating a first solenoid duty cycle as a function of transmission input torque capacity pressure; and
applying the first solenoid duty cycle to a valve means controlling the actual transmission shift pressure.

5. A method as recited in claim 4 further comprising the steps of:
calculating a second solenoid duty cycle which is a function of the first solenoid duty cycle and time; and
applying the second solenoid duty cycle to the valve means controlling the actual transmission shift pressure.

6. A method as recited in claim 5 wherein the second duty cycle function is a piecewise linear function with increasing slope having a maximum limit.

7. A method as recited in claim 5 wherein the step of storing a function of the actual transmission shift pressure and transmission input torque capacity pressure includes storing the actual transmission shift pressure magnitude corresponding to transmission gear shifts.

8. A method as recited in claim 7 further comprising the step of:
delaying a period of time, after at least one step of changing the actual transmission shift pressure to achieve the selected predetermined ratio, the step of sensing the actual transmission gear ratios so that the hydraulic transmission has time to respond.

9. A method as recited in claim 7 wherein the step of storing further includes generating a first transmission shift pressure for upshifts between two transmission gears and a second transmission shift pressure for downshifts between the same two gears.

10. A method as recited in claim 9 wherein the transmission shift pressures for upshifts and downshifts between the same transmission gears are separated by a constant magnitude pressure.

11. A method of controlling an hydraulic transmission including the steps of:
sensing driver demand requesting power transfer by the hydraulic transmission and vehicle speed;
calculating a desired transmission gear ratio as a function of the driver demand and vehicle speed;
calculating a desired pressure ratio of governor pressure to throttle valve pressure as a function of the desired transmission gear ratio;
calculating an output duty cycle to control the governor pressure as a function of desired pressure ratio and throttle valve pressure;
determining the actual transmission gear ratio by comparing the input and output speeds to the transmission gear set;
determining if the actual transmission gear ratio is the same as the desired transmission gear ratio; and
storing the throttle valve governor pressure ratio when transmission gear ratio changes occur.

* * * * *